(12) United States Patent
Striegler (10) Patent No.: US 8,378,267 B2
(45) Date of Patent: Feb. 19, 2013

(54) COATING FOR ONE OR MORE DISPLAY AREAS ON A GLASS OR GLASS-CERAMIC PLATE, PROCESS FOR PRODUCING SAID COATING, AND USES THEREOF

(75) Inventor: Harald Striegler, Ockenheim (DE)

(73) Assignee: Schott AG, Mainz (DE)

( * ) Notice: Subject to any disclaimer, the term of this patent is extended or adjusted under 35 U.S.C. 154(b) by 382 days.

(21) Appl. No.: 12/709,562

(22) Filed: Feb. 22, 2010

(65) Prior Publication Data
US 2010/0219176 A1 Sep. 2, 2010

(30) Foreign Application Priority Data
Feb. 27, 2009 (DE) .................. 10 2009 010 952

(51) Int. Cl.
*H05B 3/68* (2006.01)
(52) U.S. Cl. ........................... 219/443.1; 219/439
(58) Field of Classification Search ............... 219/443.1, 219/439, 447.1
See application file for complete search history.

(56) References Cited

U.S. PATENT DOCUMENTS

| | | | |
|---|---|---|---|
| 5,731,091 A | 3/1998 | Schmidt et al. | |
| 6,043,171 A | 3/2000 | Siebers | |
| 6,515,263 B2 | 2/2003 | Mitra et al. | |
| 6,914,223 B2 | 7/2005 | Krause et al. | |
| 7,361,405 B2 | 4/2008 | Roemer-Scheuermann | |
| 7,638,208 B2 * | 12/2009 | Striegler et al. | 428/690 |
| 8,138,671 B2 | 3/2012 | Hildenbrand et al. | |
| 2003/0019864 A1 * | 1/2003 | Krause et al. | 219/460.1 |
| 2007/0017402 A1 | 1/2007 | Jordens et al. | |
| 2007/0232476 A1 | 10/2007 | Siebers | |
| 2007/0295711 A1 * | 12/2007 | Striegler et al. | 219/448.11 |
| 2008/0190409 A1 | 8/2008 | Demol et al. | |
| 2008/0199622 A1 | 8/2008 | Roemer-Scheuermann | |
| 2008/0264931 A1 * | 10/2008 | Vilato et al. | 219/622 |
| 2009/0233082 A1 | 9/2009 | Esemann et al. | |

FOREIGN PATENT DOCUMENTS

| | | |
|---|---|---|
| DE | 43 48 360 | 5/1995 |
| DE | 197 21 737 | 11/1998 |
| DE | 100 14 373 | 10/2001 |
| DE | 103 13 630 | 10/2004 |
| DE | 103 55 160 | 6/2005 |
| DE | 10 2005 018 246 | 10/2006 |
| DE | 10 2005 046 570 | 4/2007 |
| EP | 1 414 762 | 5/2004 |

(Continued)

OTHER PUBLICATIONS

DIN 5033-1, May 2009.

(Continued)

*Primary Examiner* — Richard A. Booth
(74) *Attorney, Agent, or Firm* — Michael J. Striker (57) ABSTRACT

The transparent coating for one or more display areas of a glass or glass-ceramic plate is made by a process using a sol-gel paint containing alkyl silicates as binding agents. The transparent coating is provided on areas of the glass or glass-ceramic plate that have been left uncoated by a color-imparting opaque coating and is formed by applying the sol-gel paint to the areas left open and then thermally treating the sol-gel paint so as to cross-link reactive groups of the alkyl silicates. The coating has organic, non-hydrolyzable groups bound directly to silicon. A process for making the coating and the uses of the coated glass or glass-ceramic plate are part of the invention.

25 Claims, 4 Drawing Sheets

FOREIGN PATENT DOCUMENTS

| | | |
|---|---|---|
| EP | 1 611 067 | 1/2006 |
| EP | 1 837 314 | 9/2007 |
| EP | 1 867 613 | 12/2007 |
| EP | 1 170 264 | 1/2009 |
| FR | 2 885 995 | 11/2006 |
| FR | 2 894 328 | 6/2007 |
| JP | 2003-86337 | 3/2003 |
| JP | 200386337 * | 3/2003 |
| JP | 2003-297540 | 10/2003 |
| JP | 2004-193050 | 7/2004 |
| WO | 01/72087 | 9/2001 |
| WO | 2007/066030 | 6/2007 |
| WO | 2007/125493 | 11/2007 |

OTHER PUBLICATIONS

DIN EN 410, Dec. 1998.
DIN 6174, Oct. 2009.

* cited by examiner

COATING FOR ONE OR MORE DISPLAY AREAS ON A GLASS OR GLASS-CERAMIC PLATE, PROCESS FOR PRODUCING SAID COATING, AND USES THEREOF

CROSS-REFERENCE

The invention claimed and described herein below is also described in German Patent Application 10 2009 010 952.8, filed on Feb. 27, 2009 in Germany. The aforesaid German Patent Application, whose subject matter is incorporated by reference thereto, provides the basis for a claim of priority of invention for the invention described and claimed herein below under 35 U.S.C. 119 (a) to (d).

BACKGROUND OF THE INVENTION

1. The Field of the Invention

The present invention relates to glass or glass-ceramic plates, especially which provide cooking surfaces in cooking appliances, and their use in cooking appliances for oven doors, operating panels, and display regions.

2. Description of the Related Art

In cooking surfaces composed of glass or glass-ceramic, the configuration of regions in which information is imparted by means of illuminated displays (LEDs, LCDs etc.) is of increasing importance. Cooking surfaces made of colorless or slightly colored, transparent glass-ceramic, in particular, offer completely new opportunities compared to conventional cooking surfaces made of colored glass-ceramic.

Cooking surfaces composed of colorless glass-ceramic generally have a colored underside coating which blocks the view into the interior of the hob (of cables, metal supports, and the like). Simple leaving open of parts of the underside coating enables uncoated regions for displays ("display windows") to be produced. Individual LEDs, 7-segment displays or entire LCD visual display units are arranged behind the small (a few millimeters) or large (e.g. 10 cm×30 cm) display regions of different shapes, so that it is possible not only to indicate the operating state of the cooking surface but also to retrieve and display, for example, cooking recipes by means of infrared or capacitive touch sensors.

However, depending on the design of the illuminated displays, it can be necessary to have a coating of the cook top panel in the display region too, e.g. to restrict the visibility of electronic components (circuit boards, etc.). Particularly high-quality coatings for display regions are known from, for example, EP 1 867 613 A1. The noble metal layers proposed there have a transmittance matched to the visible spectrum of light and therefore allow both the installation of red, white or otherwise colored LEDs and also the use of colored LCD visual display units. Furthermore, they barely scatter light, as a result of which the illuminated display is very bright and clear. However, disadvantages are the high manufacturing costs associated with the noble metal content of such layers and the restricted choice of colors (only black, brown, silver, gold or copper can be obtained).

However, less expensive display coatings which allow a variety of colors are also available on the market, although in this case restrictions in respect of the display quality are consciously accepted.

Thus, for example, FR 2 885 995 A1 and WO 2007/066030 A1 propose coatings based on binding agents such as silicones, polyimides or polyamides for cooking surfaces having display regions. The coating in the display region ("display coating") is applied in areas left open in the first, color-imparting layer. Here, a color difference between the display layer and the surrounding, color-imparting layer is desired in order to emphasize the display region. The difference can be produced or reinforced by a different reflection of the display layer or a different pigmentation.

Disadvantages of the display coatings mentioned in FR 2 885 995 A1 and WO 2007/066030 A1 are the low scratch resistance and the greater scattering of the light from the display devices (as a result of the used pigments having particle sizes in the micron range). Testing of the scratch resistance of a commercially available cooking surface having a silicone-based display coating showed, that a rounded carbide metal tip (tip radius: 0.5 mm) which was adjusted perpendicular to the coating and was led horizontally across the display layer, even under a load of less than 100 g, gives a scratch trace which could be seen through the glass-ceramic, i.e. visible to the user. Therefore such display coatings require careful handling both during production and in subsequent assembly in order to keep low the costs incurred by scratched display layers (rejects). Furthermore, for aesthetic reasons the color difference between the display layer and the color-imparting layer is a disadvantage since cooking surfaces having a uniform color are desired at present.

According to JP 2003 086337 A, display coatings can also be produced by means of alkyl silicate paints (sol-gel paints). According to this Japanese document, the sol-gel-based display layer is applied as a first paint layer over the entire area of the underside of the cooking surface, and an opaque, black paint layer which is left open in the display region, is subsequently applied as light shielding layer. The display layer contains effect pigments and possibly other inorganic additives. As a result of the black light shielding layer, the effect pigments display their iridescent effect, so that the regions with the black coating have a different color from the display regions without the backing (the cooking surface is, for example, metallic grey in the region coated with two layers and white in the region coated with one layer).

The color difference between the display region and the other region can, according to JP 2003 297540 A, be reduced by providing the display region with dots of the black coating. Then the cooking surface has of least an approximately uniform shade of color. However, the display areas are only suitable for backlighting display devices, but unusable for, for example, 7-segment displays.

A significant disadvantage of the display coatings described in JP 2003 086337 A and JP 2003 297540 A is the dependence of the color of the surrounding area (hot region, cold region, etc.) on the color of the display coating. Since the display coating is applied as a first layer over the entire cooking surface, the color of the display layer continues to determine the color of the other regions of the cooking surface. The design possibilities for a cooking surface are considerably limited thereby.

SUMMARY OF THE INVENTION

It is therefore an object of the invention to provide a colored, transparent display coating for glasses or glass-ceramics, wherein
  the color of the coating is independent of the color of the remaining regions of the glass or the glass-ceramic,
and the coating
  is sufficiently transparent for illuminated displays,
  less expensive than noble metal layers,
  more scratch resistant than conventional layers and
  restricts the view into the interior of, for example, the hob to a sufficient extent.

A particular purpose of the invention is to provide display layers whose color is virtually identical to the color of the surrounding region. In particular cases, the coating also has to be suitable for capacitive touch sensors or infrared touch sensors.

The solution to this complex task is achieved using alkyl silicate paints which are applied in regions in which the opaque underside coating is absent. Due to the cooking surface is firstly provided with an opaque coating as described in DE 100 14 373 C2 or DE 10 2005 018 246 A1 and the coating having open regions ("display windows") in which an alkyl silicate paint is applied in a separate coating step, the color tones of the opaque coating and the display coating can be chosen completely independently of one another. Since the display layer based on alkyl silicates does not have to contain any noble metals, it is significantly cheaper than the solution known from EP 1 867 613 A1. Owing to their glass-like microstructure, the alkyl silicate layers are also more scratch resistant than the conventional organic layers mentioned in FR 2 885 995 A1 or WO 2007/066030 A1, particularly when baking is carried out at 200° C. or lower temperatures.

The paint can be applied in the open region by spraying, dipping, casting, painting, screen printing, pad printing or other stamp processes. Screen printing offers the advantage that the thickness of the display layer can be precisely defined via the screen density, so that constant layer thicknesses can be produced with high accuracy over wide areas in the manufacturing process. This aspect is of particular importance in the case of display layers because the transmission for the light of the illumination elements can in this way be set in a defined manner and remains constant over the entire display region. Suitable coating thicknesses are in the range of 2-20 µm, preferably 5-12 µm. At layer thicknesses below 2 µm, the display coatings are no longer sufficiently opaque and their scratch resistance is below 100 g. At layer thicknesses above 20 µm, the transmittance of the display coatings for visible light is too low and scattering effects increase substantially, so that the illuminated displays can no longer be discerned clearly enough. Adhesion problems can also occur in the case of high layer thicknesses.

The screen printing process also does not require any complicated masking technology (as in the case of spraying) for targeted application of the paint in the regions left open. Even if the coating is very thick (up to 60 µm) in the region around the display region so that the display layer has to be printed into a depression, surprisingly no problems occur in coating the display region left open despite the step to be overcome.

When, in particular, the display layer is printed with an overlap of about 1-5 mm with the coating in the remaining region, no unwetted places occur at the margins, i.e. at the edges where the coating of the surrounding region ends.

The overlapping printing of the display layer on the coating of the surrounding region is advantageous since, owing to manufacturing tolerances, the accuracy with which the template for printing of the display layer can be aligned relative to all other previously printed layers (including upper side decor) is usually 0.3-1.0 mm. Without overlap with the surrounding underside coating, regions of the display window could remain uncoated due to offsetting of the template because of the manufacturing tolerances. However, if a sufficiently large overlap of the display layer with the surrounding coating is provided, it can be ensured that the entire display region is always completely filled by the display layer.

An important condition in this context is that the display layer adheres sufficiently to the surrounding coating. In the case of display layers based on alkyl silicates, it has been found that a particularly good bond with other alkyl silicate paints, in particular the systems mentioned in DE 103 55 160 B4 and DE 10 2005 018 246 A1, is achieved. The high adhesive strength between the layers is presumably due to their chemical and structural similarity. The display layers of the invention based on alkyl silicates also adhere satisfactorily to noble metal layers as are discussed in DE 10 2005 046 570 A1 or EP 1 867 613 A1.

On the other hand, adhesion problems occur when the surrounding layer contains predominantly (more than 50% by weight based on the dry layer) of silicones (polysiloxanes) as binding agents. In this case, the interlaminar adhesion can be improved when from 0.5 to 10% by weight, in particular cases up to 30% by weight, of silicone are added to the display layer. At silicone contents higher than 30% by weight, the scratch resistance drops to below 100 g. The added silicone also increases the impermeability of the display layer towards water, oil and other liquids, as a result of which the tendency of the display layer to form spots on contact with liquids is decreased. The adhesive strength can be tested by means of the "TESA test" in which a strip of transparent adhesive tape is rubbed onto the coating and then pulled off with a jerk (Tesafilm type 104, Beiersdorf AG). If the coating cannot be detached from the glass-ceramic by means of the adhesive tape, so that no damage is visible to the user, then the underside coating adheres sufficiently strongly.

Suitable binding agents are alkyl silicates such as orthosilicic acid, polysilicic acids, esters of orthosilicic acid or esters of polysilicic acids which have one or more organic, non-hydrolysable groups and are soluble in organic solvents and cured by reaction with atmospheric moisture. Sols which can be prepared by partial hydrolysis and polycondensation of silanes with organosilanes as described in DE 043 38 360 A1 and EP 1 611 067 B1, e.g. from methyltriethoxysilane and tetraethoxysilane, are particularly suitable.

Suitable solvents for producing a screen-printable paint paste are, in particular, relatively non-volatile solvents such as butyl carbitol acetate, terpineol, methoxypropanol (VD=38), butyl glycol (VD=165) or butyl diglycol (VD>1200) having an evaporation number (VD) above 35 and a boiling point above 120° C. ($VD_{diethyl\ ether}=1$). The relatively non-volatile, high-boiling solvents firstly have the task of keeping the paint liquid, i.e. processable, in the screen, and, secondly, it is important that the concentration of the paint remains constant during processing so that reproducible layer thicknesses and, as a result, a constant transmission of the coating can be achieved. A constant concentration of the paint during processing can only be achieved using sufficient proportions of relatively non-volatile solvents in the paint because readily volatile (VD<10) or moderately volatile (VD=10–35) solvents would evaporate during printing of the paint and the concentration of the paint would change unacceptably as a result.

However, experiments also showed that readily volatile solvents such as ethanol (VD=8.3) or moderately volatile solvents such as butyl acetate (VD=11) can be present in certain amounts without unacceptably high transmission changes occurring as a result of evaporation of the solvent and the associated increase in the concentration during the screen printing process. In particular, the proportion of readily volatile solvents must, not be higher than the proportion of relatively non-volatile solvents. The solution, which is also called a "sol", is composed of binders and solvents and should comprise 30-60% by weight of film-forming, pre-condensed organosilanes and 70-40% by weight of solvents.

Such a sol is virtually colorless after drying or baking. In order to reduce the light transmittance of the coating, the addition of pigments is therefore necessary. Pigments which are thermally stable up to 200° C. at least briefly (1-10 minutes) are suitable. The display coating normally does not have to withstand higher temperatures, firstly because the 7-segment display devices or LCD visual display units located underneath do not permit higher temperatures and such display areas are therefore provided in the cold region of the cooking surface and secondly because touch sensors are usually arranged in the vicinity of the display regions and the cooking surface has to be colder than 60° C. in the region of the switches so that the user's fingers are not burnt when operating the cooking surface.

Apart from the thermally very stable inorganic pigments, organic pigments are therefore also suitable. The pigments should, because of the legal requirements for electric and electronic appliances, not contain any lead, hexavalent chromium ($Cr^{+VI}$), cadmium or mercury. Colored and black inorganic pigments such as iron oxide pigments, chromium oxide pigments or oxidic mixed-phase pigments having a rutile or spinel structure and white inorganic pigments (oxides, carbonates, sulphides) are suitable. Examples of suitable pigments are iron oxide red pigments composed of haematite ($\alpha$-$Fe_2O_3$), iron oxide black pigments having the approximate composition $Fe_3O_4$ and the mixed-phase pigments cobalt blue $CoAlO_4$, zinc iron brown $(Zn,Fe)FeO_4$, chromium iron brown $(Fe,Cr)_2O_4$, iron manganese black $(Fe,Mn)(Fe,Mn)_2O_4$, spinel black $Cu(Cr,Fe)_2O_4$ and graphite and also the white pigments $TiO_2$ and $ZrO_2$.

To achieve special effects in the coloring, it is also possible to use lustrous inorganic pigments (metallic effect pigments, pearl pigments and interference pigments). Platelet-like particles of aluminium, copper or copper-zinc alloys are suitable as metallic effect pigments.

As organic pigments, it is possible to use azo pigments (e.g. naphthol AS, dipyrazolone), polycyclic pigments (e.g. quinacridone, perylene) or metal complex pigments (e.g. copper phthalocyanine pigments).

The average particle diameter of the pigments is usually in the range of 1-25 μm (preferably 5-10 μm). D90 should be below 40 μm (preferably 6-15 μm), D50 should be below 25 μm (preferably 6-8 μm) and D10 should be below 12 μm (preferably 2-5 μm). Platelet-like pigments should have a maximum edge length of 60-100 μm (preferably 5-10 μm) so that the paint paste can be pressed without problems through 140-31 mesh sieves (corresponding to a mesh opening of 36 μm) or 100-40 mesh sieves (corresponding to a mesh opening of 57 μm). Coarser pigments give coatings which scatter visible light too strongly, so that the illuminated display can no longer be discerned clearly enough. The finer the pigments, the less the display layer scatters visible light and the clearer (sharper) the display becomes. At the particle sizes mentioned, a scattering of 5-40% (wavelength range: 400-800 nm) usually occurs (see EP 1 867 613 A1). When pigments are used having particle sizes below 1 μm, scattering can be reduced to less than 5%. However the difficulty of dispersing the nanoparticles and stabilizing the paint paste and the costs associated therewith have an unfavorable ratio to the gain in display quality of such low-scattering layers.

The proportion of pigment in the baked coating should be 2-45% by weight, preferably 25-40% by weight. At pigment content below 2% by weight, the light transmittance of the display layer is too high, so that the view into the interior of the hob is not prevented to a sufficient extent. At pigment content higher than 45% by weight, the light transmittance of the display layer is too low, so that the illuminated displays can no longer be sufficiently clearly perceived.

Figure 5:
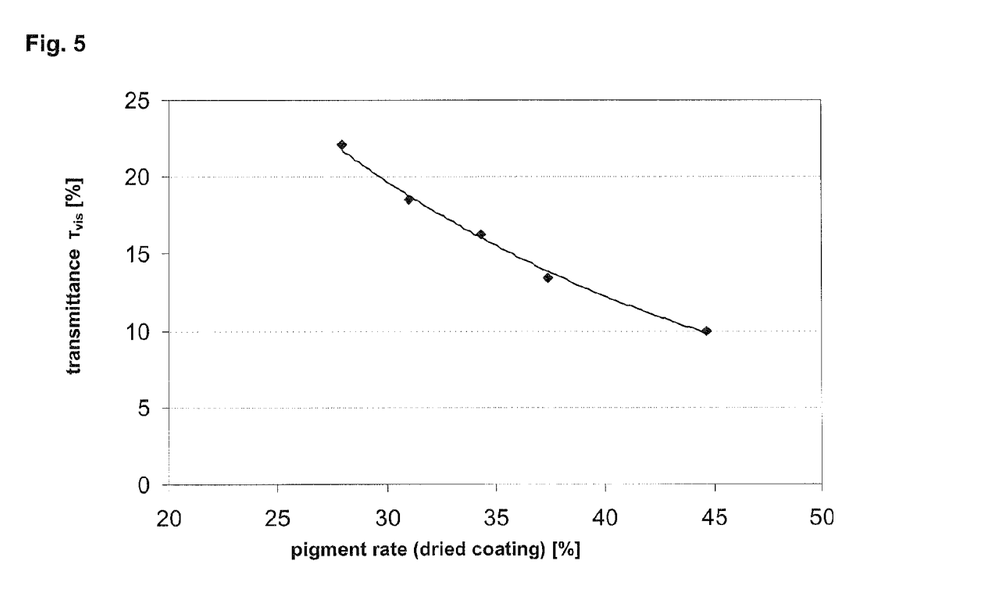
FIG. 5 is a graphical illustration of the dependence of transmittance on the pigment rate (dried coating) in %.

The specified pigment contents and layer thicknesses give a light transmittance $\tau vis$ in the region of visible light of 10-40%, in particular 12-18% (calculated in accordance with DIN EN 410 for light type D65). The exponential relationship between pigment content of the dry display layer and the light transmittance which is expected from the Lambert-Beer law is depicted by way of example in FIG. 5 for the display layer having the composition E (pigment content: 37.4%; light transmittance: 13.4%) and a varying pigment content.

Since the pigmented sol is too fluid for use in screen printing, the viscosity has to be increased by addition of fillers. Otherwise, the paint would drip through the screen after flooding and processing would be impossible or at least made very difficult.

Suitable thickeners and thixotropes which do not change the color and transmission of the printing ink are, for example, polyacrylates, polysiloxanes (resins which are solid at 20° C.), pyrogenic silicas or cellulose derivatives. Silicas are particularly suitable for increasing the viscosity (in the case of an acidic sol, cellulose derivatives decompose and the paint paste would be stable for only a few days). However, the proportion of silica (based on the baked layer) should not exceed 15% by weight, and the unusually high (for printing inks) proportion of 4-10% by weight is ideal. At a proportion of more than 15% by weight of silica, the viscosity of the printing ink is too high, so that a closed film is no longer obtained, i.e. small uncoated regions occur in the display layer. In these places, the illumination elements would shine disproportionately brightly through the cooking surface, thus spoiling the aesthetic impression. At a proportion below 1% by weight, the viscosity of the paint is too low, so that the paint drips through the screen.

To optimize the printed image, antifoams, wetting agents and levelling agents can be added to the printing ink (e.g. 0.1-2% by weight of polysiloxane having a viscosity of 5000-50000 mPa·s).

Display coatings having the same or comparable shade of color as the coating of the surrounding region are obtained by using the same pigment or (in the case of a plurality of pigments) the same pigments as in the surrounding coatings, maintaining the ratio of the pigments to one another and only reducing the total proportion of pigment (in each case based on the dried layer) from usually 42-46% by weight in the surrounding coatings to 25-90%, in particular 60-85%, of the original value, corresponding to a total pigment content of the dried display coating of 25-39% by weight. Here, depending on the color and fineness of the pigments and the screen used, very different total pigment contents in the display layer are sometimes necessary in order to obtain the appropriate transmission.

However, the paint for the display area cannot be produced simply by adding solvent to the paint used for the surrounding region. The viscosity of the paint obtained would be too low and processing by means of screen printing would become impossible because the paint would drip through the screen. Instead, the total proportion of pigment has to be decreased by increasing the proportion of sol and the proportion of thickeners or thixotropes (e.g. silica), with the abovementioned limits having to be adhered to.

Thus, for example, display coatings which are comparable in color to the opaque alkyl silicate coatings described in DE 103 55 160 B4 (whose transmission $\tau_{vis}$ is below 2%) can be produced having a light transmittance that 7-segment displays or LCD visual display units sufficiently brightly shine through when switched on and are sufficiently covered in the switched-off state.

The printing ink obtained can, as mentioned above, be printed by means of screens having a fineness of 140-31 or 100-40 onto glass or glass-ceramic plates. Coarser screens are not advisable because they give a less uniform printed image with fluctuations in layer thickness, which considerably impair the display quality. The coating can subsequently be dried and baked. The objective of drying is to remove the solvents from the coating. Drying can be carried out at room temperature or at up to 200° C. In general, depending on the temperature, times of from a few minutes to a few hours, in particular 1-45 min at 100-200° C., are sufficient.

The subsequent baking results in elimination of alcohol (generally ethanol) and water and formation of chemical bonds between the film former molecules, with a silicon oxide network being formed in the coating. As a result of baking, the coating is densified and therefore becomes hard and scratch resistant. Drying and baking can be carried out in one step, e.g. by means of a thermal treatment of the coating at 200° C. for 45 minutes.

The scratch resistance of the coating is highest when very complete crosslinking between the reactive groups, in particular the alkoxysilane groups and the hydroxy groups, takes place during baking without the organic groups bound directly to silicon (e.g. aryl or alkyl groups) being thermally eliminated. The elimination of these organic groups which modify the silicon oxide framework and are not intended for a condensation reaction usually takes place only at above 200° C. (more often above 250° C.). A temperature of 200° C. should therefore not be exceeded during baking so that the scratch resistance of the display layer is maximized. The scratch resistance of the display layers obtained by the process described above is at least 100 g, in particular cases even 200 g.

Owing to the reactivity of the sol, the vitreous microstructure of the layer can naturally also be formed, as long as the time is sufficient, without baking solely by reaction with water from the air. However, for time reasons and to obtain a defined layer structure, baking at 150-200° C. and a defined atmospheric humidity is preferred.

When the cooking surface, coated on the underside should be suitable for capacitively operating touch sensors (e.g. touch control units), it is necessary for the alkyl silicate coating in the display region to be electrically nonconductive, i.e. the electrical surface resistance of the display coatings should be in the megaohm, better in the gigaohm, range (at above 10⁹ $\Omega$/square). This property is achieved by avoiding electrically conductive pigments (e.g. metal powders, aluminium flakes, graphite) in the display coating or at least by keeping the proportion of the electrically conductive materials in the coating to such a small amount, that a sufficiently high surface resistance is ensured (up to 10% by weight of graphite, for example, is permissible in the display coating at a layer thickness of not more than 10 μm). Electrical conductivity of the coating can also be prevented using aluminium flakes or other electrically conductive pigments when these pigments are coated by an electrically nonconductive layer (e.g. aluminium flakes coated with silicon oxide).

It has also been found that display coatings having a transmittance $\tau_{vis}$ in the range of visible light of 20-40% are suitable for infrared touch sensors. However, the transmittance in the range of visible light is only a rough measure of suitability for IR sensors. The critical factor is the light transmittance of the display coating at 940 nm (the wavelength at which the IR sensors operate). This should be at least 25%, in particular in the range 30-80%. Depending on the pigment type, display coatings having a transmittance in the range of visible light $\tau_{vis}$ of less than 20% can therefore also be suitable for IR sensors (see, for example, example 2, Table VII, composition D).

Suitable substrate materials for the coating system are, for example, glass-ceramics of the type $Li_2O$—$Al_2O$—$SiO_2$, in particular colorless glass-ceramic having a thermal expansion of from $-10 \cdot 10^{-7}$ $K^{-1}$ to $+30 \cdot 10^{-7}$ $K^{-1}$ in the temperature range 30-500° C., whose known composition is reported, inter alia, in table I below:

TABLE I

COMPOSITION OF SUITABLE GLASS-CERAMIC SUBSTRATES

| Element oxide | Glass-ceramic composition [% by weight] | | |
|---|---|---|---|
| $SiO_2$ | 66-70 | 50-80 | 55-69 |
| $Al_2O_3$ | >19.8-23 | 12-30 | 19-25 |
| $Li_2O$ | 3-4 | 1-6 | 3-4.5 |
| MgO | 0-1.5 | 0-5 | 0-2.0 |
| ZnO | 1-2.2 | 0-5 | 0-2.5 |
| BaO | 0-2.5 | 0-8 | 0-2.5 |
| $Na_2O$ | 0-1 | 0-5 | 0-1.5 |
| $K_2O$ | 0-0.6 | 0-5 | 0-1.5 |
| $TiO_2$ | 2-3 | 0-8 | 1-3 |
| $ZrO_2$ | 0.5-2 | 0-7 | 1-2.5 |
| $P_2O_5$ | 0-1 | 0-7 | — |
| $Sb_2O_3$ | — | 0-4 | — |
| $As_2O_3$ | — | 0-2 | — |
| CaO | 0-0.5 | 0 | 0-1.5 |
| SrO | 0-1 | 0 | 0-1.5 |
| $Nd_2O_3$ | — | — | 0.004-0.4 |
| $B_2O_3$ | — | — | 0-1 |
| $SnO_2$ | — | — | 0-0.4 |
| Source | EP 1 170 264 B1 Claims 14-18 | JP 2004-193050 A | EP 1 837 314 A1 |

The glass-ceramics contain at least one of the following refining agents: $As_2O_3$, $Sb_2O_3$, $SnO_2$, $CeO_2$, sulphate or chloride compounds.

Rolled or floated glass plates made of alumino-silicate glass, soda-lime glass, borosilicate glass or alkaline earth metal silicate glass are also suitable, particularly when the plates have been chemically or thermally (as described, for example, in EP 1 414 762 B1) pre-stressed.

The alkyl silicate paints are suitable not only for use in display areas of cook top panels but also for display regions in controllable optical screens or other applications in which glass or glass-ceramic plates are subjected to temperatures of no higher than 200° C.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

In a first example (grey display layer), a colorless glass-ceramic plate 1 is used as starting material which is smooth on both sides and about 60 cm wide, 80 cm long and 4 mm thick and has the composition described in EP 1 837 314 A1 (table I) and has been coated on the upper side with a ceramic decor paint 6 as described in DE 197 21 737 C1 in a grid of dots which has been left open in the display region 3 and has been ceramicized.

Figure 1:
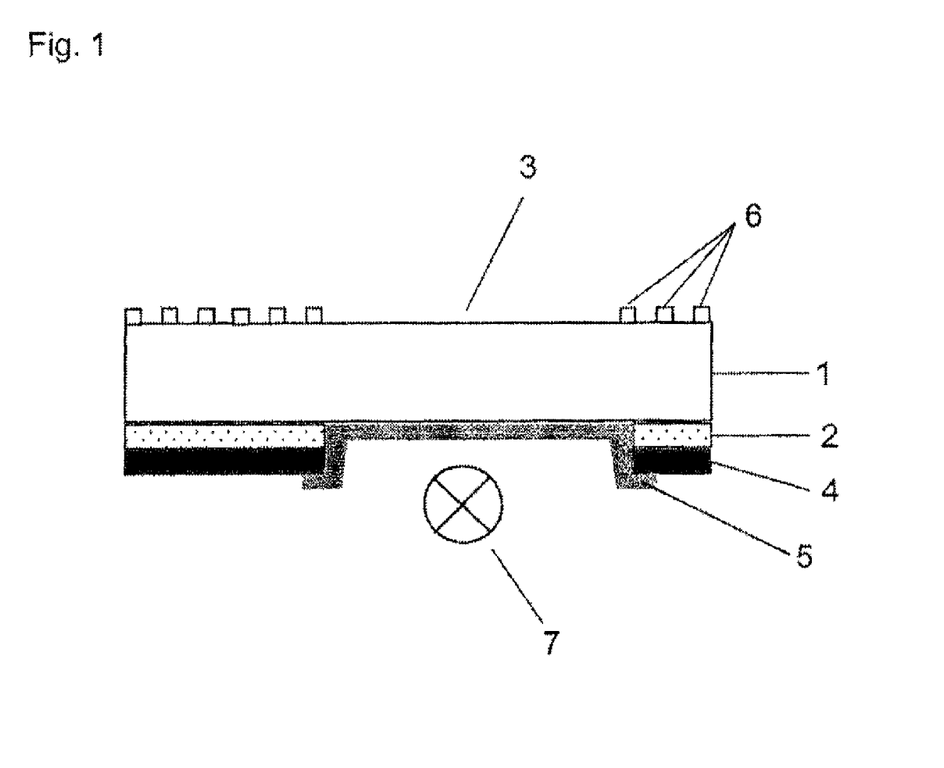
FIG. 1 is a schematic sectional view through a first embodiment of a glass or glass-ceramic plate with a transparent coating according to the invention in an area of the plate that is not covered by a color-imparting opaque coating.

As shown in FIG. 1, a first, color-imparting and opaque paint layer 2 of a sol-gel paint having the composition (A) shown in table II was subsequently applied by screen printing (screen 54-64) to the underside of the ceramicized glass-ceramic plate 1 over the entire area but with the display region left open.

The color-imparted coating 2 was dried at 100° C. for 1 hour and baked at 300° C. for 8 hours. A further sol-gel paint 4 was subsequently printed (likewise 54-64 mesh) as second paint layer (covering layer) onto the first paint layer 2 and dried at 150° C. for 30 minutes in order to achieve properties such as a high scratch resistance and also impermeability to water and oil. Details regarding the underside coating of glass-ceramic cooking surfaces with color-imparting, opaque sol-gel layers may be found in DE 103 55 160 B4.

An alkyl silicate paint having the composition (B), table 2, was then applied by screen printing (screen 100-40) in the left-open display region 3, with the display layer 5 having an overlap of about 1 mm with the surrounding coating. The display layer 5 was dried at 150° C. for 30 minutes.

Figure 2:
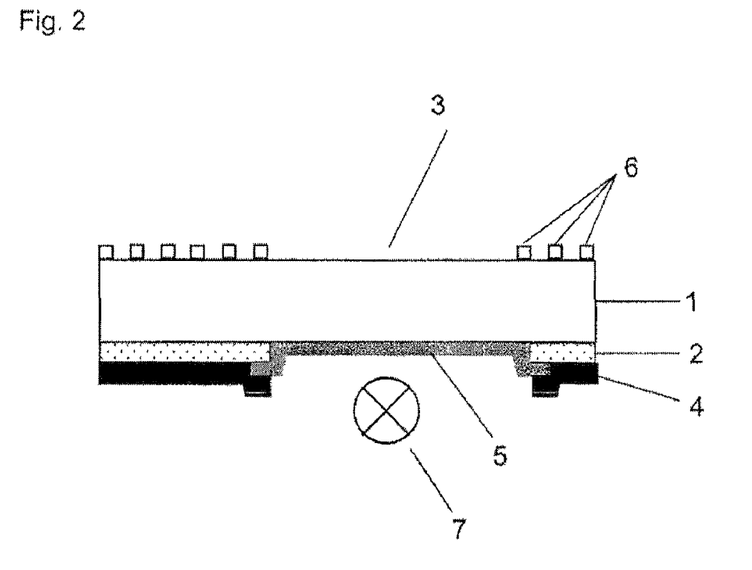
FIG. 2 is a schematic sectional view through a second embodiment of a glass or glass-ceramic plate with a transparent coating according to the invention in an area of the plate that is not covered by a color-imparting opaque coating.

In a further embodiment, the order in which the display layer 5 and the covering layer 4 are applied can also be reversed: the display layer 5 is then applied in the display region 3 after baking of the color-imparting layer 2 and the covering layer 4, left open in the display region, is applied to the dried display layer 5, as shown in FIG. 2.

Figure 3:
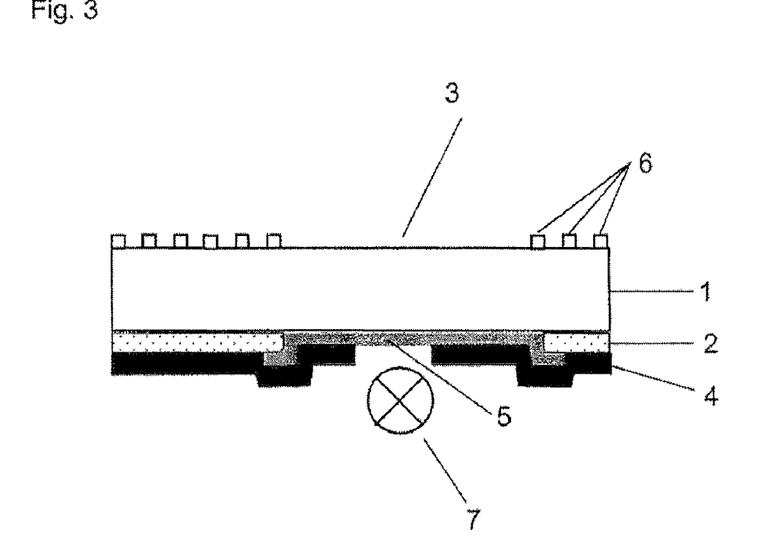
FIG. 3 is a schematic sectional view through a third embodiment of a glass or glass-ceramic plate with a transparent coating according to the invention in an area of the plate that is not covered by a color-imparting opaque coating.

A further development of this embodiment is depicted in FIG. 3 where the covering layer 4 extends into the display region 3 and only individual, small regions, e.g. directly above the illumination means 7, remain free. The advantage of this embodiment is that even in the case of extremely strong illumination of the cooking area (e.g. by means of halogen lamps of modern extraction hoods) in the display region 3 it is not possible to see into the hob because the covering layer 4 reduces the transmission to below 2% with the exception of particular regions (e.g. directly above LEDs).

As sol, use was made of an acidified mixture of methyltriethoxysilane and tetraethoxysilane in butyl carbitol acetate and ethanol. The solids content of the sol was 47.5%.

Composition (B) was obtained by reducing the proportion of pigment in composition (A) to 62% (based on the compositions of the baked layers) and by adjusting the viscosity of the printing ink by reducing the ethylene glycol content and increasing the silica content (Tables II and III).

TABLE II

COMPOSITION OF THE PRINTING INKS

| | Composition in % by weight | |
|---|---|---|
| PAINT COMPONENT | A (color-imparting layer) | B (display layer) |
| Sol | 62.6 | 75.6 |
| Iriodin ® 111 (from Merck) | 18.9 | 11.2 |
| Graphite (from Luh) | 6.0 | 3.5 |
| Silica HDK N20 (from Wacker) | 2.3 | 3.6 |
| Ethylene glycol | 9.9 | 5.8 |
| Antifoam S (from Schwegmann) | 0.3 | 0.3 |

TABLE III

COMPOSITION OF THE BAKED LAYERS

| | Composition in % by weight | |
|---|---|---|
| LAYER COMPONENT | A (color-imparting layer) | B (display layer) |
| Binder | 52.3 | 66.3 |
| Iriodin ® 111 | 33.2 | 20.6 |
| Graphite | 10.5 | 6.5 |
| Silica | 4.0 | 6.6 |

As a result of the display layer being applied in a separate (second or third) printing step in the intended, left-open region, the color of the display layer can be chosen independently of the surrounding, color-imparting layer. The total thickness of the color-imparting layer and the covering layer together is 35.4±3.0 µm. The thickness of the display layer is 9.3±1.2 µm. The display layer could be printed without problems (without unprinted regions on the corners) in the left-open region.

Since the recipe of the display coating (composition [B]) has been produced from the color-imparting layer (composition [A]) by reducing the proportion of pigment while maintaining the pigment ratio (Iriodin®:graphite=3.2:1), the shade of color of the display layer is comparable to the shade of color of the color-imparting layer.

The color values of the two corresponding layers are shown in table IV. They were recorded using a spectrophotometer (Mercury 2000, from Datacolor) from the point of view of the user, i.e. through the substrate (type of light: D65, observation angle: 10°). The display layer was measured firstly with a white tile as background, and secondly with a black trap as background. The color values are reported according to the CIELAB system (DIN 5033, part 3 "color measurement numbers"). According to DIN 6174, the color difference $\Delta E=2.2$ (white background) and $\Delta E=4.5$ (black background).

The dependence of the colors on the background can clearly be seen from the measured values. The difference between the shades of color (display layer/color-imparting layer) is due essentially to differences in the L* value (lightness), i.e. the background, and was to be expected because the display layer is not completely opaque but still somewhat transparent and contains the same pigments in the same ratio as the color-imparting layer. As the small differences in the values a* and b* (color shades) show, the color-imparting layer and the display layer are approximately comparable in terms of their color ($|\Delta a^*| \leq 0.4, |\Delta b^*| \leq 1.4$). It could also be said that the display layer and the color-imparting layer have the same shade of color with different brightness. On examination with an eye having normal vision, the color difference is therefore perceived only as small or pleasant.

The color transition from the display layer to the surrounding layer (color-imparting layer or covering layer) can be made even less conspicuous by coating the upper side of the cooking surface with the abovementioned ceramic paint in the transitional area (for example in the form of lines, dots, symbols or writing).

TABLE IV

COLOR VALUES OF THE DISPLAY LAYER AND THE COLOR-IMPARTING LAYER

| Specimen | Color values | | | |
|---|---|---|---|---|
| | L* | a* | b* | ΔE |
| Color-imparting layer with composition (A) | 60.0 | −1.24 | 2.36 | reference |
| Display layer with composition (B), white background | 61.6 | −0.85 | 3.79 | 2.2 |
| Display layer with composition (B), black background | 55.7 | −1.64 | 1.44 | 4.5 |

Figure 4:
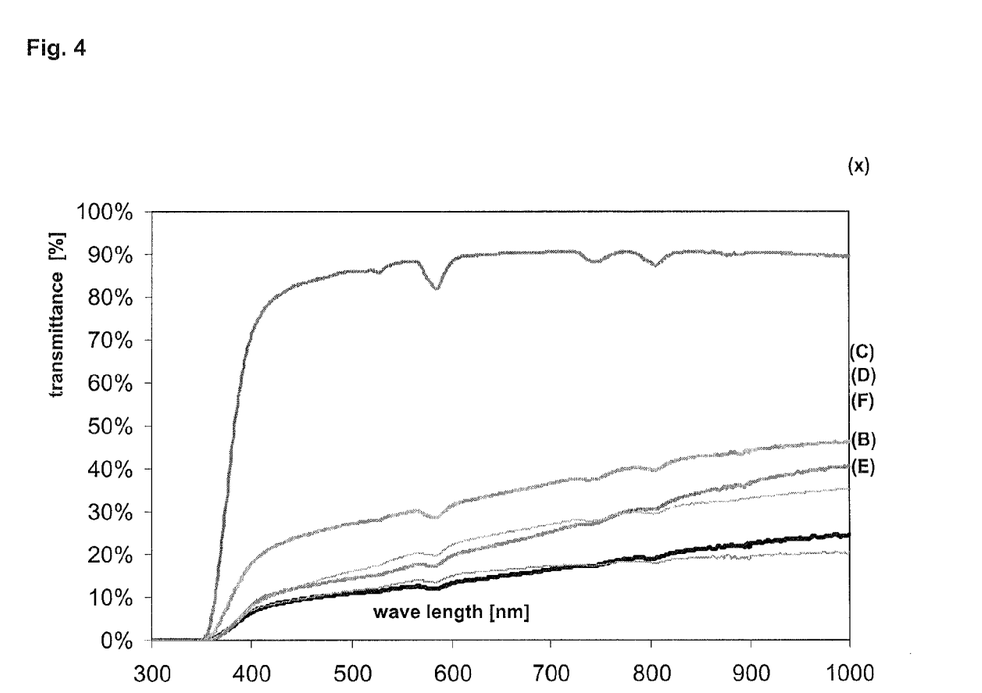
FIG. 4 is a graphical illustration of the transmittance of the uncoated glass-ceramic plate and the display area of the plate coated with respective different display coatings B to F in a wavelength range of 400 to 800 nm.

The light transmittance $\tau_{vis}$ of the display layer (measured through the glass-ceramic substrate) is 12.6%. FIG. 4 shows the transmittance curve of the uncoated glass-ceramic and the glass-ceramic coated in the display area.

Figure 6:
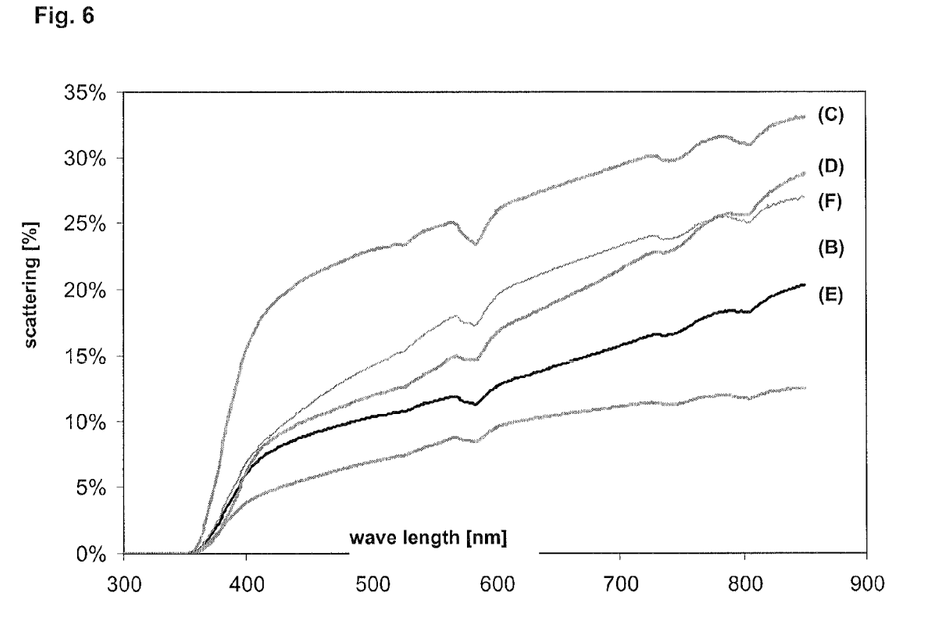
FIG. 6 is a graphical illustration of the dependence of the percentage of the light scattering versus wavelength for five different display coatings B to F in a wavelength range of 400 to 800 nm.

The scattering of the display layer determined by the same method as in EP 1 867 613 A1 is usually 6-18%, in particular cases only 3-12%. FIG. 6 shows the scattering curves of the glass-ceramic having display coatings of the compositions B to F in the relevant wavelength region of 400-800 nm.

The cooking surface was installed in a hob and tested under conditions relevant to practical use (with illumination under customary extraction hoods) to determine whether the switched-on illuminated display (7-segment display of a touch control field from E.G.O.) is sufficiently discernible. Since the presently customary illumination elements of the display can clearly be discerned at a distance of 60-80 cm (i.e. shine sufficiently sharply and brightly through the coated glass-ceramic), the scattering and the transmission of the display layer are satisfactory. With the illuminated display switched off, a check was made under the same illumination conditions to determine whether the touch control field can be discerned through the display layer. Since the control field was not discernible in the switched-off state, the display layer restricts the view into the hob to a sufficient extent.

Since the display layer does not contain any noble metals, it is significantly cheaper than coatings based on noble metal preparations.

The scratch resistance of the coating is 200 g and is thus more than twice as high as that of conventional display layers with silicone resins as film formers. The scratch resistance was measured by placing a carbide metal tip (tip radius: 0.5 mm) loaded with the respective weight (100 g, 200 g, 300 g) vertically on the coating and moving the tip this over the coating for a distance of about 30 cm at a velocity of 20-30 cm/s. Evaluation was carried out by the user looking through the glass-ceramic. The test at the selected load is considered to have been passed when no damage is visible at a distance of 60-80 cm with a white background and under daylight D65.

Since the display layer contains only a small proportion of an electrically conductive pigment (6.5% by weight of graphite based on the baked layer), the coating is suitable for capacitive touch sensors. Testing was carried out by means of the above-mentioned touch control unit from E.G.O. The cooking zones could be switched without problems via the capacitive touch sensors of the unit, since the electrical surface resistance of the coating is above 20 GΩ/square (20° C.).

The surface resistance can be determined relatively simply using an ohmmeter by placing the two electrodes of the measuring instrument very close to one another (with a spacing of about 0.5-1 mm) on the coating. The resistance indicated by the measuring instrument corresponds approximately to the surface resistance of the coating.

The display layer of composition (B) is not suitable for infrared touch sensors because the transmittance in the near infrared region (at 940 nm) is below 25%, as shown in FIG. 4.

Example 2 produces light-grey, beige, dark-grey and beige-grey display layers.

The display paint used in example 1 can be replaced by the compositions (C-F), Table V, which makes a great variety of paints having differing degrees of transparency and increased scratch resistance possible.

TABLE V

PAINT COMPOSITIONS OF FURTHER DISPLAY PAINTS

| | Composition in % by weight | | | |
|---|---|---|---|---|
| PAINT COMPONENT | C (light-grey) | D (beige) | E (dark-grey) | F (beige-grey) |
| Sol | 82.8 | 69.0 | 66.9 | 64.3 |
| Iriodin ® 111 (from Merck) | 4.7 | 14.2 | — | 4.9 |
| Iriodin ® 103 (from Merck) | — | 4.6 | 14.0 | 14.2 |
| Iriodin ® 323 (from Merck) | — | — | 2.0 | 2.9 |
| Graphite (from Luh) | 1.5 | 1.9 | 4.6 | 1.8 |
| Silica HDK N20 (from Wacker) | 4.5 | 3.0 | 2.7 | 2.3 |
| Ethylene glycol | 6.3 | 7.0 | 9.5 | 9.3 |
| Antifoam Mittel S (from Schwegmann) | 0.2 | 0.3 | 0.3 | 0.3 |

Composition C is a more transparent variant of composition B. Printing through a 140-31 mesh screen gives a display layer having a light transmittance $\tau_{vis}$ of 32.8% (FIG. 4) and a coating thickness of 5.7±0.4 μm. The scratch resistance is 100 g. In contrast to composition B, composition C is suitable for IR touch sensors because the transmittance at 940 nm is above 30%.

Table VI shows the compositions of the baked display layers. The properties of the display layers are summarized in Table VII. Composition D is notable for the fact that despite a low transmittance in the region of visible light, the transmittance in the infrared region (at 940 nm) is sufficient for infrared touch sensors.

TABLE VI

COMPOSITION OF THE BAKED DISPLAY LAYERS

| | Composition in % by weight | | | |
|---|---|---|---|---|
| LAYER COMPONENT | C (light-grey) | D (beige) | E (dark-grey) | F (beige-grey) |
| Binder | 78.5 | 58.1 | 57.7 | 53.9 |
| Iriodin ® 111 | 9.5 | 25.3 | — | 8.5 |
| Iriodin ® 103 | — | 8.1 | 25.5 | 25.4 |
| Iriodin ® 323 | — | — | 3.6 | 5.1 |
| Graphite | 3.0 | 3.3 | 8.4 | 3.1 |
| Silica | 9.0 | 5.2 | 4.9 | 4.0 |

TABLE VII

PROPERTIES OF THE DISPLAY LAYERS

| | | Composition | | | |
|---|---|---|---|---|---|
| PROPERTY | B (light-grey) | C (light-grey) | D (beige) | E (dark grey) | F (beige-grey) |
| Layer thickness (screen) | 9.3 ± 1.2 μm (100-40) | 5.7 ± 0.4 μm (140-31) | 7.5 ± 0.8 μm (140-31) | 8.3 ± 1.3 μm (100-40) | 7.3 ± 0.3 μm (100-40) |
| Transmission $\tau_{vis}$ | 12.6% | 32.8% | 17.1% | 13.4% | 19.5% |
| Transmission at 940 nm | 23.6% | 45.4% | 38.7% | 20.1% | 34.2% |
| Suitability for IR touch sensors | no | yes | yes | no | yes |
| Suitability for capacitive sensors | yes | yes | yes | yes | yes |
| Scratch resistance | 200 g | 100 g | 100 g | 200 g | 100 g |
| Color values (Measurement through glass-ceramic. Layer in front of white tile) L* | 61.6 | 62.8 | 67.2 | 60.1 | 68.5 |
| a* | −0.85 | 0.44 | 0.52 | −0.28 | 0.18 |
| b* | 3.79 | 4.64 | 4.72 | 4.08 | 9.29 |
| View into hob sufficiently reduced | yes | yes | yes | yes | yes |
| Sufficiently transparent for illuminated displays | yes | yes | yes | yes | yes |
| Scattering at 400 nm | 6% | 16% | 6% | 3.8% | 6.8% |
| Scattering at 800 nm | 18% | 31% | 26% | 11.8% | 25.2% |

While the invention has been illustrated and described as embodied in a coating for a display area of a glass or glass-ceramic plate, process for producing said coating, and uses thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A transparent coating for one or more display regions of a glass or glass-ceramic plate that is coated over a full surface thereof,
   wherein the transparent coating is a sol-gel paint having alkyl silicates as binding agent and is arranged in parts of the glass or glass-ceramic plate that are not covered with an opaque coating, and
   wherein the alkyl silicates have reactive groups that are cross-linked by thermal treatment and the sol-gel paint has organic, non-hydrolyzable groups bound directly to silicon.

2. The transparent coating according to claim 1, wherein said sol-gel paint contains solvents, pigments, fillers and other binding agents in addition to said alkyl silicates.

3. The transparent coating according to claim 1, wherein the alkyl silicates comprise esters of orthosilicic acid or esters of polysilicic acids.

4. The transparent coating according to claim 1, wherein the sol-gel paint contains at least one solvent and said at least one solvent comprises at least one relatively non-volatile, high-boiling organic compound having an evaporation number VD above 35 and a boiling point above 120° C.

5. The transparent coating according to claim 4, wherein the at least one solvent is selected from the group consisting of butyl carbitol acetate, terpineol, methoxypropanol, butyl glycol and butyl diglycol.

6. The transparent coating according to claim 4, wherein the proportion of volatile solvents with an evaporation number less than or equal to 35 in the sol-gel paint is lower than that of the at least one relatively non-volatile, high-boiling organic compound.

7. The transparent coating according to claim 1, wherein the sol-gel paint comprises a sol formed by binding agents and solvents and said sol contains 30 to 60 wt. % of film-forming pre-condensed organosilanes and 70 to 40 wt. % of at least one solvent.

8. The transparent coating according to claim 1, wherein the sol-gel paint comprises at least one color-imparting ingredient selected from the group consisting of inorganic pigments and organic pigments.

9. The transparent coating according to claim 8, containing from 2 to 45 wt. % of said pigments after the thermal treatment.

10. The transparent coating according to claim 9, containing from 25 to 40 wt. % of said pigments after the thermal treatment.

11. The transparent coating according to claim 8, wherein said inorganic pigments include colored pigments, black pigments, iron oxide pigments, chromium oxide pigments, oxidic mixed-phase pigments having a rutile or spinet structure, white oxide pigments, white carbonate pigments and white sulfide pigments and wherein said organic pigments include azo pigments, polycyclic pigments and metal complex pigments.

12. The transparent coating according to claim 8, wherein the pigments consist of pigment particles with an average particle diameter from 1 μm to 25 μm.

13. The transparent coating according to claim 12, wherein the average particle diameter is from 5 μm to 10 μm.

14. The transparent coating according to claim 1, wherein the sol-gel paint is applied to the one or more display areas by spraying, dipping, casting, painting, screen printing, pad printing, or stamping processes.

15. The transparent coating according to claim 1, having a layer thickness in a range from 2 μm to 20 μm after the thermal treatment.

16. The transparent coating according to claim 15, wherein the layer thickness is from 5 μm to 12 μm.

17. The transparent coating according to claim 1, which is arranged in depressed regions of the glass or glass-ceramic plate which have been left open.

18. The transparent coating according to claim 1, which overlaps the opaque coating.

19. The transparent coating according to claim 18, which extends over the opaque coating for a distance of 1 to 5 mm.

20. The transparent coating according to claims 1, which is overlapped by a further covering layer arranged on top of the opaque coating.

21. The transparent coating according to claim 1, having a composition with components or ingredients that are the same as those of the opaque coating.

22. The transparent coating according to claim 1, wherein the thermal treatment of the sol-gel paint takes place at $\leqq 200°$ C. in order to cure the paint.

23. A process of making a transparent coating over one or more display regions of a glass or glass-ceramic plate that is coated over a full surface thereof, which is arranged in parts of the glass or glass-ceramic plate that have been left open in an opaque coating on the glass or glass-ceramic plate, said process comprising the steps of:
   a) applying a sol-gel paint comprising alkyl silicates to said parts of said glass or glass-ceramic plate that have been left open in the opaque coating; and
   b) thermally treating the sol-gel paint applied to said parts at a temperature that is less than or equal to 200° C.

24. A cooking surface, oven door, operating panel or display regions having a transparent coating as defined in claim 1.

25. A coated glass or glass-ceramic plate for a cooking surface, an operating panel, or a display area in a cooking appliance, said coated glass or glass-ceramic plate comprising
   an opaque paint layer covering said surface on said one side so that said opaque paint layer fully covers said surface, except that said opaque paint layer is provided with at least one opening in said display region; and
   a transparent sol-gel coating that covers said at least one opening in said display region;
   wherein said transparent sol-gel coating includes cross-linked alkyl silicates and non-hydrolyzable organic groups bound directly to silicon in said alkyl silicates.

* * * * *